United States Patent [19]
Sato

[11] Patent Number: 5,319,415
[45] Date of Patent: Jun. 7, 1994

[54] INTERCHANGEABLE LENS AND CAMERA SYSTEM INCORPORATING THE SAME LENS

[75] Inventor: Susumu Sato, Chiba, Japan

[73] Assignee: Nikon Corporation, Tokyo, Japan

[21] Appl. No.: 26,587

[22] Filed: Mar. 5, 1993

[30] Foreign Application Priority Data

Mar. 16, 1992 [JP] Japan .................................. 4-057648

[51] Int. Cl.⁵ ........................ G03B 13/36; G03B 7/099
[52] U.S. Cl. .................................. 354/406; 354/477; 354/286
[58] Field of Search ............... 354/402, 403, 404, 405, 354/406, 407, 408, 409, 412, 286, 477

[56] References Cited

U.S. PATENT DOCUMENTS

| | | | |
|---|---|---|---|
| 4,481,413 | 11/1984 | Wilwerding | 354/406 |
| 4,506,970 | 3/1985 | Fujibayashi | 354/406 |
| 4,508,443 | 4/1985 | Matsuzaki et al. | 354/402 |
| 4,529,286 | 7/1985 | Fujii | 354/402 |
| 4,652,931 | 3/1987 | Okudaira et al. | 354/406 |
| 4,694,151 | 9/1987 | Yoshimura | 354/406 |
| 4,716,284 | 12/1987 | Tanaka | 354/406 |
| 4,949,117 | 8/1990 | Van Heyningen et al. | 354/412 |
| 5,103,254 | 4/1992 | Bell et al. | 354/409 |

FOREIGN PATENT DOCUMENTS 59-128506  7/1984  Japan .

Primary Examiner—Russell E. Adams
Attorney, Agent, or Firm—Shapiro and Shapiro

[57] ABSTRACT

A focal detector built-in interchangeable lens is disclosed. During photographing, a release signal is transmitted via a transmitting means to a control part provided in the interchangeable lens from a control part provided in a camera body. Based on this release signal, the interchangeable lens control part retreats a light path splitting means outwardly of a light path of a bundle of rays used for photographing, the splitting means splitting the rays toward a focal detection means.

16 Claims, 5 Drawing Sheets

INTERCHANGEABLE LENS AND CAMERA SYSTEM INCORPORATING THE SAME LENS

BACKGROUND OF THE INVENTION

1. Field of the Invention

The present invention relates generally to an interchangeable lens mountable into a camera body of a lens interchangeable type and to a camera system incorporating this interchangeable lens. This invention relates more particularly to an interchangeable lens including a focal detector and to a camera system incorporating this interchangeable lens.

2. Related Background Art

A conventional focal detector built-in interchangeable lens is disclosed in, e.g., Japanese Patent Application Laid-open No. 59-128506. This interchangeable lens is of such a type that an elongate mirror is disposed with a tilt in a location apart from the optical axis within a light path of the interchangeable lens, and the light reflected by this mirror is led to a focal detector.

In the conventional focal detector built-in interchangeable lens described above, however, as shown in FIG. 6, a mirror 2 for leading some of a bundle of incident rays to a focal detector 1 is fixedly provided. The rays incident on the interchangeable lens are cut off by this mirror 2. For this reason, only doughnut-like rays T indicated by oblique lines in the Figure reach a focal surface 9a of the interchangeable lens 9. There arises such a problem that the actual brightness becomes lower than a brightness of the interchangeable lens. Then, the doughnut-like rays are projected on a film surface of an out-of-focus portion of a subject, i.e., on a focal surface 9b when defocused. Consequently, there is produced a problem in which a doughnut-like blur is formed in the case of projecting the rays T on the film surface 9b when defocused; and this blur is an extreme eyesore.

Further, as illustrated in FIG. 7, the rays passing through the interchangeable lens are incident on a focal detector (AF module 14) incorporated into a conventional camera body via a quick return mirror 13A and an auxiliary mirror 13B. Then, when this AF module 14 detects a focal point of a reflex telephoto lens, a bundle of rays S incident on the reflex telephoto lens are partly cut off by a submirror 6A. It is therefore impossible to perform a precise focal detection. Besides, this AF module 14 detects the focal point of the interchangeable lens other than the above-described reflex telephoto lens. In this case also, if a full-aperture F-number of this interchangeable lens is large, the rays incident on the interchangeable lens are partly cut off by a metal frame and a fixed stop of the interchangeable lens. The precise focal detection can not be therefore performed. The reason for this will be elucidated. Respective bundles of rays reaching the individual light receiving elements are partly cut off by a pair of image-reforming lenses provided in the AF module 14. Hereupon, there arises a possibility wherein a symmetry of the rays is lost, and a correlation can not be taken by the pair of light receiving elements. It is therefore impossible to precisely detect the focal point.

SUMMARY OF THE INVENTION

Accordingly, it is a primary object of the present invention to provide an interchangeable lens capable of causing no drop in the actual brightness, eliminating an eyesore blur (defocused image) on an image surface (film surface) and further preventing a bundle of rays for detecting a focal point from being eclipsed.

To accomplish the foregoing object, according to one aspect of the present invention, there is provided an interchangeable lens mountable into a camera body, comprising: a focalizing lens so provided as to be movable in the optical-axis direction of the interchangeable lens; a light path splitting means for splitting a bundle of photographing rays outwardly of a light path of the photographing rays, the rays passing through the interchangeable lens; an image-forming state detecting means for detecting an image-forming state of the interchangeable lens by receiving the rays split by the light path splitting means; a driving means for driving the focalizing lens in the optical-axis direction; a retreating means for retreating the light path splitting means outwardly of the light path of the photographing ray; a transmitting means for transmitting a release signal from the camera body to the interchangeable lens; and a control means for controlling the retreating means on the basis of the release signal through the transmitting means during photographing and controlling the driving means on the basis of a signal from the image-forming state detecting means during focalizing.

According to the present invention having the construction given above, the light path splitting means is so provided as to be retreatable outwardly of the photographing light path. Hence, a sufficient amount of rays can be led to the image-forming state detecting means during a focal detection with no constraint in terms of placing the light path splitting means. Therefore, the highly precise focal detection can be attained in principle without any constraint by a magnitude of brightness and a-type of the interchangeable lens. For instance, in a reflex type interchangeable lens provided with a cut-off part at its center, the rays that are not cut off by this cutoff part can be led to the image-forming state detecting means. The precision of the focal detection does not worsen.

Moreover, the light path splitting means retreats outside the photographing light path during photographing. Consequently, no loss of light quantity is caused. Besides, it is feasible to actualize the interchangeable lens which does not deteriorate a state of blur of the defocused portion.

According to another aspect of the present invention, there is provided a camera system incorporating with an interchangeable lens detachably attached to a camera body, comprising: the camera body for outputting a release signal during photographing, and the interchangeable lens. This interchangeable lens includes: a focalizing lens so provided as to be movable in the optical-axis direction of the interchangeable lens; a light path splitting means for splitting a bundle of photographing rays outwardly of a light path of the photographing rays, the rays passing through the interchangeable lens; an image-forming state detecting means for detecting an image-forming state of the interchangeable lens by receiving the rays split by the light path splitting means; a driving means for driving the focalizing lens in the optical-axis direction; a retreating means for retreating the light path splitting means outwardly of the light path of the photographing rays; a control means for controlling the retreating means and the driving means; and a transmitting means for transmitting a release signal from the camera body to the interchangeable lens. The control means controls the retreating means on the basis of the release signal during photographing and controls the driving means on the basis of a signal from the image-forming state detecting means during focalizing.

With this construction, the focalization is controlled on the side of the interchangeable lens. The control system of the camera body is therefore burdened with nothing at all. Hence, it is possible to execute the highly precise focalization without decreasing a processing speed of the focalizing control.

According to still another aspect of the present invention, there is provided a camera system comprising: a camera body; and an interchangeable lens detachably attached to the camera body. The interchangeable lens includes: a focalizing lens movable in the optical-axis direction of the interchangeable lens; a driving means for driving the focalizing lens in the optical-axis direction; a first light path splitting means for splitting a bundle of photographing rays outwardly of a light path of the photographing rays, the rays passing through the interchangeable lens; a first image-forming state detecting means for detecting an image-forming state of the interchangeable lens by receiving the rays split by the first light path splitting means; a retreating means for retreating the first light path splitting means outwardly of the light path of the photographing rays; a first control means for controlling the driving means on the basis of an output from the first image-forming state detecting means; and a transmitting means for transmitting a signal from the camera body to the control means. The camera body includes: a second light path splitting means for splitting the photographing rays outwardly of the light path of the photographing rays, the rays passing through the interchangeable lens; a second image-forming state detecting means for detecting the image-forming state of the interchangeable lens by receiving the rays split by the second light path splitting means; and a second control means for controlling the driving means on the basis of an output from the second image-forming state detecting means and outputting a release signal to the first control means via the transmitting means during photographing. The first control means controls the first retreating means on the basis of the release output during photographing. The first image-forming state detecting means has a focusing range wider than a focusing range of the second image-forming state detecting means.

According to the camera system having the construction described above, the rough focalization is conducted by the first image-forming state detecting means on the side of the interchangeable lens. The precise focalization can be effected on the side of the camera body. The precise focalization is therefore executable even in the case of the interchangeable lens such as a super telephoto lens having a very large shift quantity of the image surface position.

Further, with the construction given above, it is possible to attain the focalization of the interchangeable lens such as the super telephoto lens having the large image surface shift quantity without changing the first image-forming state detecting means provided on the side of the camera body.

Other objects, advantages and effects of the present invention will become sufficiently apparent during the following full discussion in conjunction with the accompanying drawings.

DESCRIPTION OF THE PREFERRED EMBODIMENTS

Embodiments of the present invention will hereafter be described in detail with reference to the accompanying drawings.

Figure 1:
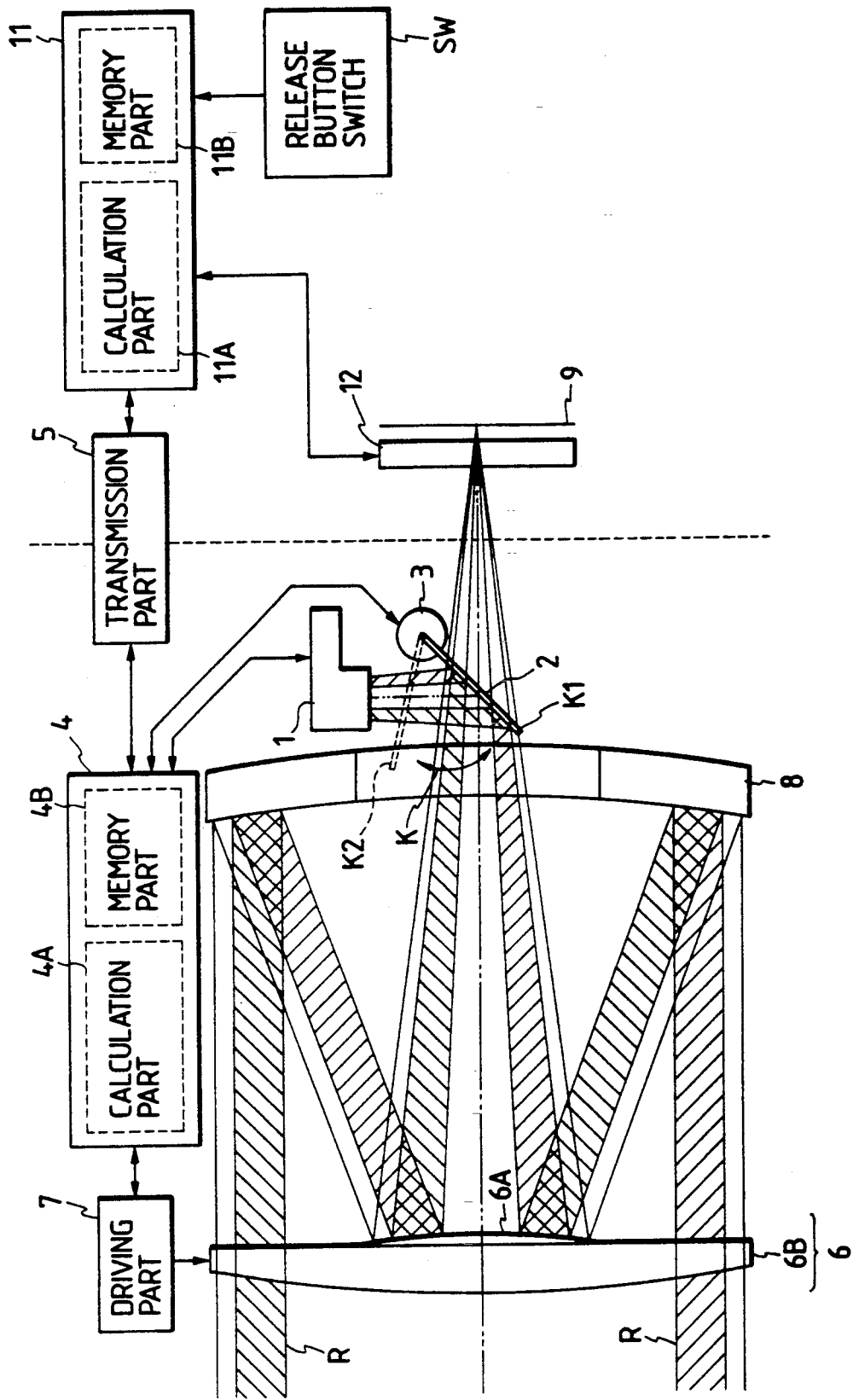
FIG. 1 is a schematic view illustrating a first embodiment of the present invention.

FIG. 1 is a schematic view illustrating a whole camera system incorporating an interchangeable lens, wherein the interchangeable lens in a first embodiment of this invention serves as a reflex telephoto lens. The interchangeable lens and a camera body are partitioned by a dotted line in the illustration. Note that as a bundle of rays incident on the interchangeable lens, only the rays emerging from the infinity and parallel to the optical axis are shown in FIG. 1. As an optical system of this interchangeable lens, only focalizing optical systems 6A, 6B and a reflecting mirror 8 are illustrated for a simplicity of explanation.

Referring to FIG. 1, the optical system of the interchangeable lens is constructed of a main mirror 8, a submirror 6A and a front lens 6B. The main mirror 8 and the submirror 6A in combination form an image by reflecting rays emitted from a subject. The front lens 6B integral with the submirror 6A contributes to chiefly compensate an aberration. The submirror 6A and the front lens 6B that are defined as a focalizing optical system move together in the optical-axis direction, thus attaining focusing of this interchangeable lens.

Then, this interchangeable lens includes the focalizing optical systems 6A, 6B, the main mirror 8, a half mirror member 2, an AF module 1, a focalizing lens driving part 7, a mirror retreating part 3, an interchangeable lens control part 4 and a transmission part 5. The focalizing optical systems 6A, 6B and the main mirror 8 cooperate to form an image of the light from the subject on a film surface (image surface) 9 on the side of the camera body. The half-mirror member 2 splits a bundle of photographing rays passing though this interchangeable lens outwardly of an optical path thereof. The AF module 1 detects an image-forming state (a focusing state) of the interchangeable lens by receiving the rays split by the half mirror member 2. The focalizing lens driving part 7 drives the focalizing optical systems 6A, 6B in the optical-axis direction. The mirror retreating part 3 retreats the half-mirror member 2 outwardly of the light path of the photographing rays. The transmission part 5 including an electrical contact transmits signals between the interchangeable lens control part 4 and the camera body.

On the other hand, the camera body mounted with this interchangeable lens comprises a shutter 12, a camera body control part 11 and a release button SW. The shutter 12 makes a predetermined exposure on the focal surface (image surface) 9. The control part 11 performs communications with the control part 4 via the transmission part 5 by operating the shutter 12. This camera body control part 11 includes a calculation part 11A for effecting calculations and a memory part 11B for storing a content of communications with the interchangeable lens control part 4.

Turning again to FIG. 1, the rays incident on the interchangeable lens travel through the front lens 6B and are reflected by the main mirror 8. Thereafter, the rays are, after being reflected again by the submirror 6A, projected to form an image on the focal surface (image surface) 9. Then, some of focal detection rays R indicated by oblique lines are reflected upwards by the half-mirror member 2 defined as a light path splitting means.

Figure 2:
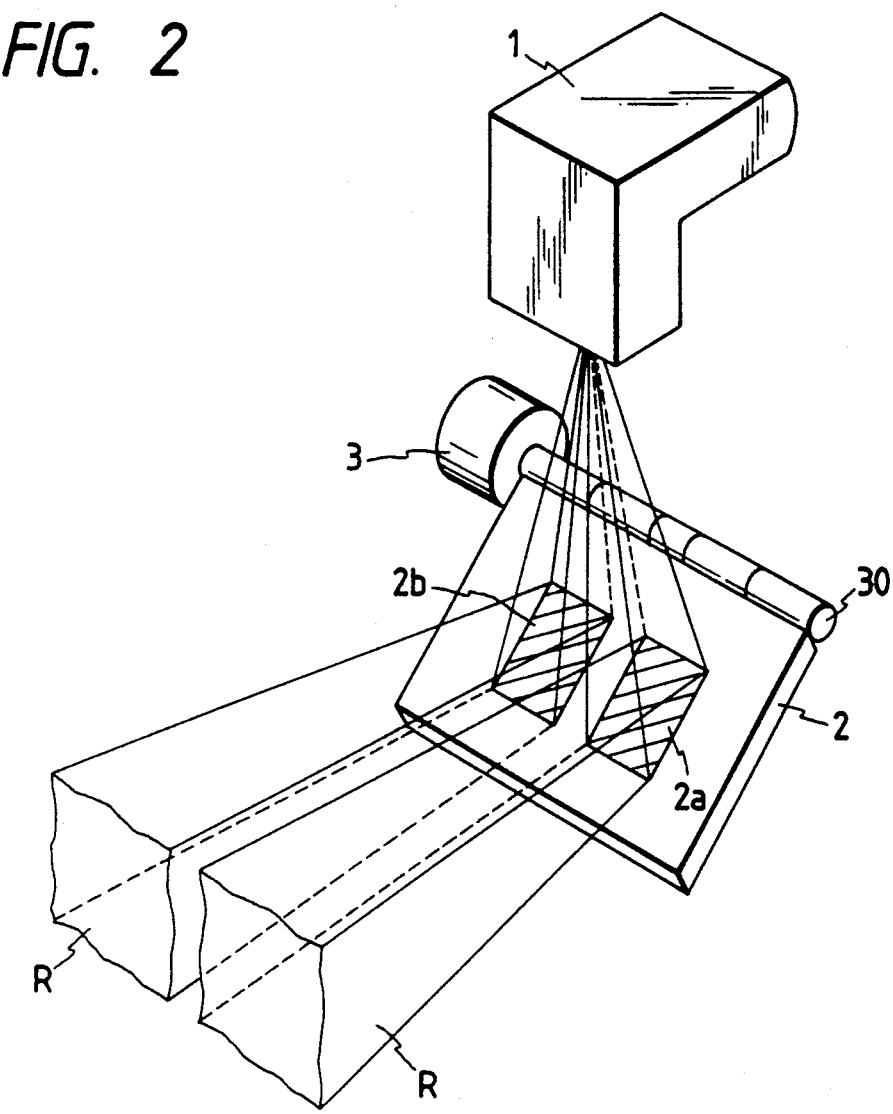
FIG. 2 is a schematic view illustrating in enlargement a construction in the vicinity of a half-mirror member in the first embodiment.

This half-mirror member 2 is, as illustrated in FIG. 1, movable in an arrowed direction K between a location K1 provided on the skew within the light path of the rays passing through the interchangeable lens and a retreat location K2 indicated by a broken line outwardly of the light path. Further, as shown by the oblique lines in a schematic view of FIG. 2 illustrating the half-mirror member 2, half-reflection surfaces 2a, 2b for splitting the rays toward the AF module 1 are deposited on some areas of the half-mirror member 2 consisting of a transparent plane-parallel plate. Areas other than these half-reflection surfaces 2a, 2b transmit all the rays. Further, the half-reflection surfaces 2a, 2b are deposited in such positions as to be capable of reflecting the doughnut-like rays on a focal detector without causing eclipses thereof, these rays passing through the reflex telephoto lens defined as the interchangeable lens. Then, the mirror retreating part 3 defined as a retreating means supports the half-mirror member 2 through a shaft 30. The mirror retreating part 3, as illustrated in FIG. 1, moves the half-mirror member 2 in the arrowed direction K between the location K1 provided on the skew and the retreat location K2 with the aid of an inside motor or the like. Besides, this mirror retreating part 3 transmits, to the lens control part 4, a signal indicating whether the half-mirror member 2 is positioned in the skewed location K1 or in the retreat location K2 through an internally provided contact or the like.

Then, the interchangeable lens control part 4 includes the calculation part 4A for effecting the calculation and the memory part 4B for storing information of the interchangeable lens itself and the content of communications with the camera body control part 11. This information of the interchangeable lens itself contains: a signal indicating whether the lens is an AF module built-in one or not; and an interchangeable lens image surface moving coefficient (a variation in the image surface moving coefficient due to variable power in the case of a zoom lens) showing a shift quantity of the image surface with respect to a moving quantity of the focalizing lens.

Figure 5A:
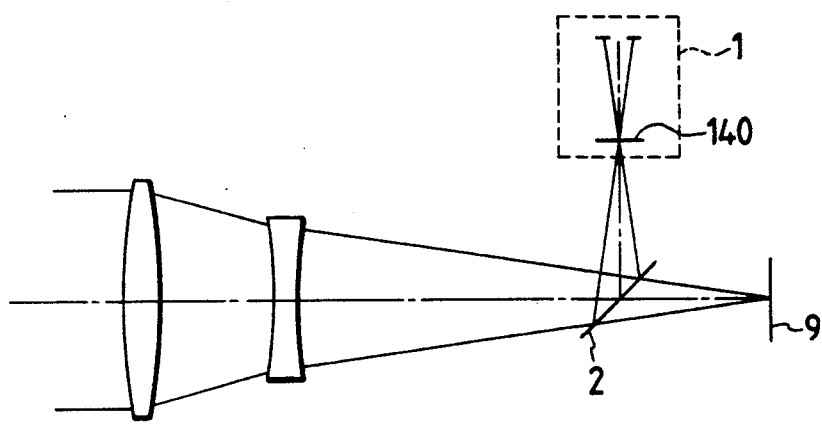
FIG. 5A is a view showing a placement of a focal detection means (AF module)
Figure 5B:
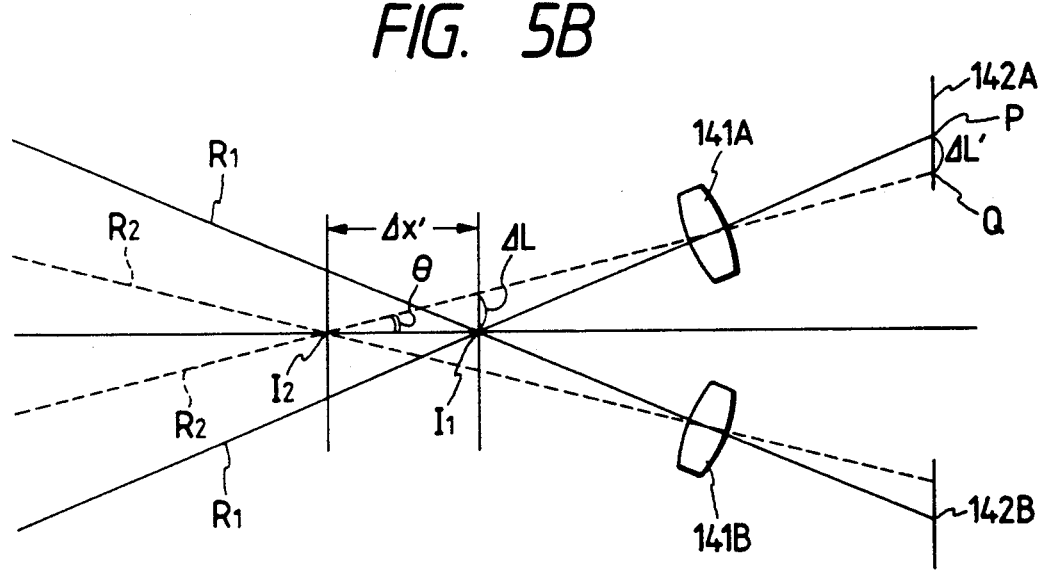
FIG. 5B is a principle view of assistance in explaining the focal detection means (AF module)
Figure 6:
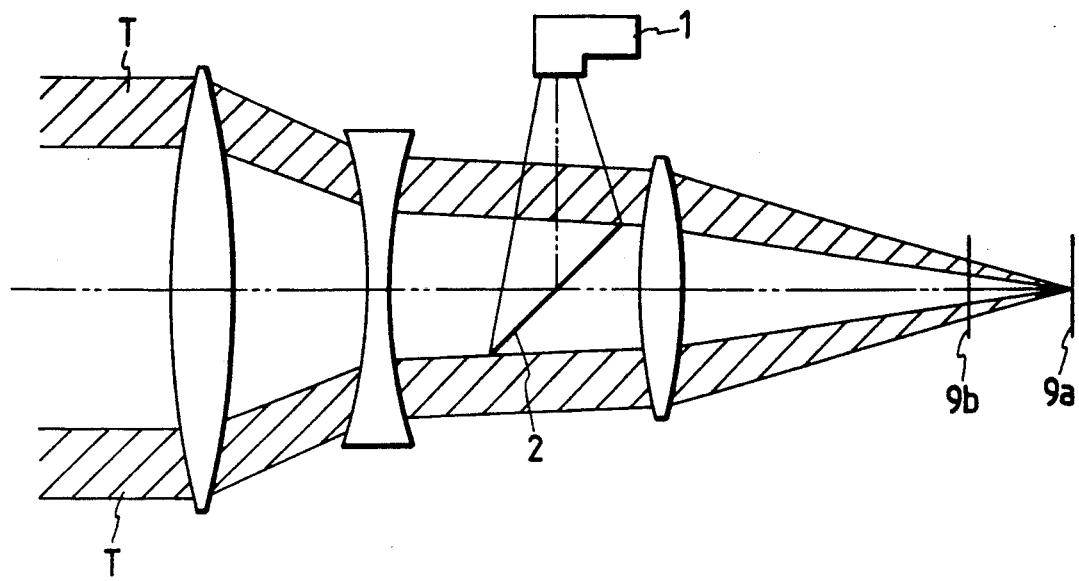
FIG. 6 is a view of assistance in explaining problems inherent in the prior arts.
Figure 7:
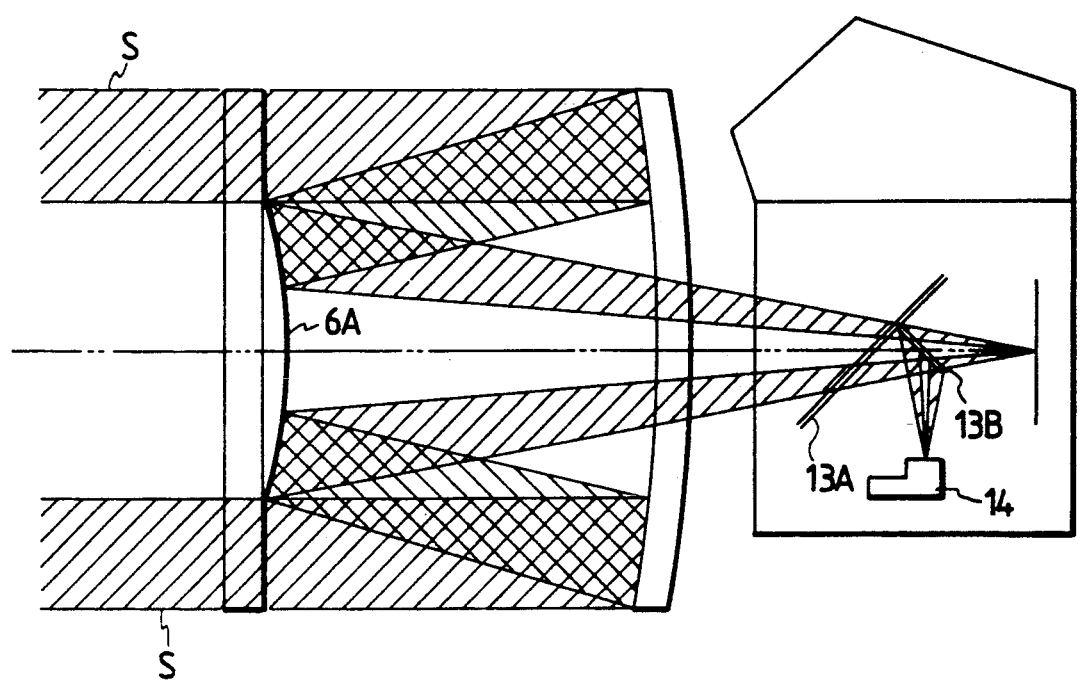
FIG. 7 is a view of assistance in explaining the problems inherent in the prior arts.

By the way, an applicable version of the AF module 1 may be a focal detector disclosed in, e.g., U.S. Pat. No. 4,544,255. FIGS. 5A and 5B are views showing a principle of the focal detection means (AF module). The AF module 1 is, as illustrated in FIGS. 5A and 5B, provided with a pair of image-reforming lenses 141A, 141B disposed in rear of an image surface 140 equivalent to the interchangeable lens image surface 9. The AF module 1 is an optical system for reforming a primary image on the equivalent image surface 140 on a pair of light receiving elements 142A, 142B as a secondary image through the pair of the image-reforming lenses 141A, 141B. Then, as depicted in FIG. 5B, when focalized, i.e., when a ray $R_1$ employed for detecting the focal point is image-formed at an image point $I_1$, this ray $R_1$ is image-reformed in a position P substantially centered on the light receiving element 142A through the image-reforming lens 141A. Further, a ray $R_2$ is image-formed at an image point $I_2$ spaced $\Delta x'$ apart from the image point $I_1$. The ray $R_2$ is image-reformed in position Q through the image-reforming lens 141A.

Herein, a transverse offset quantity $\Delta L$ of the ray $R_2$ on the image surface 140 is expressed such as:

$$\Delta L = \Delta x' \cdot \tan \theta \qquad (1)$$

where $\theta$ is the angle made by the ray $R_2$ and the optical axis when the ray $R_2$ travels through on the image surface 140.

Then, a difference $\Delta L'$ between the positions P and Q is given by:

$$\Delta L' = |\beta| \cdot \Delta L \qquad (2)$$

where $\beta$ is the magnification of the image-reforming lens 141A. From the formulae (1) and (2) described above, the formula (3) is established as below:

$$\Delta L' = |\beta| \cdot \Delta x' \cdot \tan \theta \qquad (3)$$

Namely, the AF module 1 performs a function to take a correlation between the transverse offset quantities $\Delta L'$ of a pair of secondary images on the pair of light receiving elements 142A, 142B and to transmit this correlation in the form of an image-forming state signal to the interchangeable lens control part 4. Note that this AF module 1 can be disposed anywhere if on the side of the image surface of the focalizing lens in the interchangeable lens. When the AF module 1 is disposed in a location other than the one nearest to the image surface of the interchangeable lens, however, a condenser optical system is provided on the incident side of the AF module 1. An image is formed desirably on the image surface equivalent to the image surface of the interchangeable lens in the vicinity of the incident side of the AF module 1.

Turning back to FIG. 1, the autofocusing operation in this embodiment will hereafter be fully discussed.

To start with, when half-depressing a release button SW on the side of the camera body, the camera body control part 11 transmits an AF start signal to the interchangeable lens control part 4 via the transmission part 5. The interchangeable lens control part 4 receives this AF start signal. The interchangeable lens control part 4 permits a start of detection of an image-forming state of the focal detection rays R incident on the AF module 1 through the half-mirror member 2 tilted within the photographing light path. Image-forming state information indicates a current image-forming state, detected by this AF module 1, of the interchangeable lens. The image-forming state information is transmitted to the interchangeable lens control part 4 defined as an interchangeable lens control means.

The interchangeable lens control part 4 calculates a lens driving quantity of the focalizing lens driving part 7 from the image-forming state information transmitted and the image-surface moving coefficient in the memory part 4B. Information on this lens driving quantity is transmitted to the focalizing lens driving part 7. Based on the transmitted information on the lens driving quantity, the focalizing lens driving part 7 then drives the focalizing optical systems 6A, 6B.

Hereat, if the image-forming state information detected by the AF module 1 does not indicate an in-focus state after a completion of the drive by the focalizing optical systems 6A, 6B, the interchangeable lens control part 4 recalculates a lens driving quantity. Based on the calculated lens moving quantity, the focalizing lens driving part then drives the focalizing optical systems 6A, 6B. Further, when the image-forming state information indicates the in-focus state, the interchangeable lens control part 4 transmits a focalization terminating signal to the camera body control part 4 via the transmission part 5 serving as a transmission means and having the electrical contact. With the operations described above, autofocusing by use of the AF module 1 incorporated into the interchangeable lens is thus completed.

After finishing the autofocusing operation stated above, photographing takes place. Operations during photographing will hereafter be explained with reference to FIG. 1.

At the first onset, when manipulating the release button SW on the side of the camera body, the camera body control part 11 transmits a release signal to the interchangeable lens control part 4 via the transmission part 5. Then, the interchangeable lens control part 4 drives, upon receiving this release signal, the mirror retreating part 3. The half-mirror member 2 is thereby retreated from the skewed location K1 to the retreat location K2. Further, the mirror retreating part 3 transmits, after the half-mirror member 2 has completely moved to the retreat location K2, a retreat completion signal to the interchangeable lens control part 4. This mirror retreat completion signal is transmitted via the transmission part 5 to the camera body control part 11. Thereafter, the camera body control part 11 receiving the mirror retreat completion signal permits the shutter 12 to operate. Then, upon a completion of action of the shutter 12, the camera body control part 11 transmits a shutter action completion signal to the interchangeable lens control part 4. The interchangeable lens control part 4 drives, upon receiving the shutter action completion signal, the mirror driving part 3. The half-mirror member 2 is thereby returned to the skewed location K1 from the retreat location K2.

It is herein assumed that the shutter 12 of the camera body starts operating before the retreat of the half-mirror member is completed or that the return of the half-mirror member 2 is started before the action of the shutter 12 is completed. In this case, the half-mirror member 2 is positioned in the light path of the photographing rays. Some of rays traveling toward the film surface (image surface) 9 are split by the half-reflection surfaces 2a, 2b of the half-mirror member 2. Consequently, an amount of rays lacks on the film surface (image surface), or alternatively a blur of an out-of-focus portion of the subject appears unnatural. In accordance with this embodiment, the following steps are done for preventing such an inconvenience from being caused. During photographing, as stated above, the interchangeable lens control part 4 communicates with the camera body control part 11 through the transmission part 5. Determined are operation timings of the half-mirror member 2 in the interchangeable lens and of the shutter 12 in the camera body.

Note that the operation timings of the half mirror member 2 in the interchangeable lens and of the shutter 12 in the camera body may be determined based on a shutter speed set on the side of the camera body. At this time, the set shutter speed is transmitted via the transmission part 5 to the interchangeable lens control part 4 when mounting the interchangeable lens into the camera body. Then, the interchangeable lens control part 4 determines the operation timing of the half-mirror member 2 on the basis of this set shutter speed. Further, the shutter 12 on the side of the camera body operates with a delay corresponding to a time elapsed till an end of retreat of the half-mirror member 2 on the side of the interchangeable lens since the camera body control part 11 has manipulated the shutter release button.

As discussed above, in accordance with the first embodiment of the present invention, the rays with no eclipse can be led to the AF module 1 without any constraint in terms of an arrangement of the half-mirror member 2. Furthermore, the half-mirror member 2 retreats outwardly of the photographing light path during photographing. It is therefore possible to actualize the interchangeable lens exhibiting a fineness with respect to the blur of the defocused portion with no loss of the amount of rays.

In addition, in accordance with this embodiment, the focalizing control is conducted on the side of the interchangeable lens. Hence, the camera body control part is burdened with nothing at all. Accordingly, the highly accurate focalization can be executed without inducing a drop in processing speed under the focalizing control.

Figure 4:
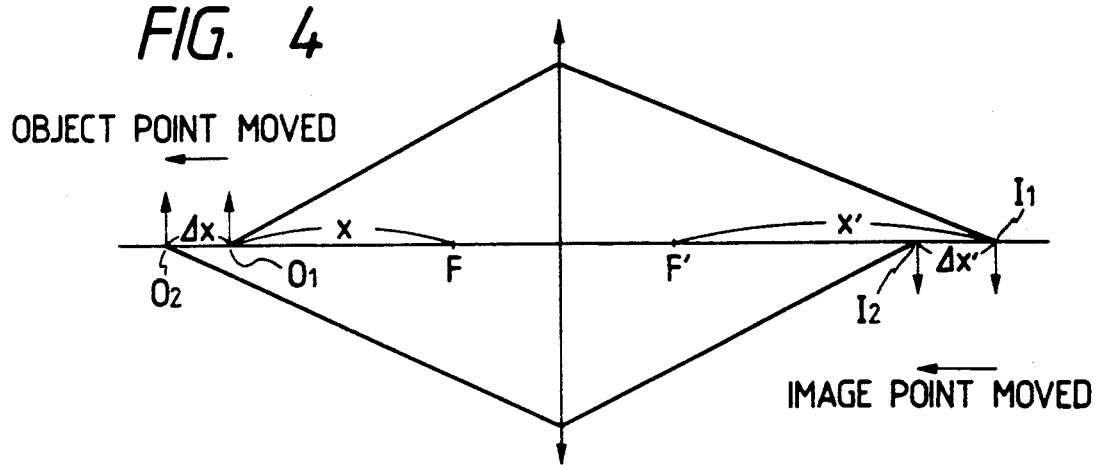
FIG. 4 is a principle view of assistance in explaining a relationship between an object point and an image point.

By the way, the interchangeable lens having a large focal length as in a super telephoto lens has such a characteristic that a shift quantity (defocus quantity) of an image surface position is very large with respect to a variation quantity of a subject distance. Let f be the focal length of the interchangeable lens shown by an arrow, $O_1$ be the original object point and $I_1$ be the original image point in FIG. 4. Let x be the distance from the front focal point F of the interchangeable lens to the object point $O_1$ and x' be the distance from the rear front focal point F' of the interchangeable lens to the image point $I_1$. The above-mentioned is an initial state. Next, when the object point moves to an object point $O_2$ spaced $\Delta x$ apart from the original object point $O_1$, the image point moves to an image point $I_2$ spaced $\Delta x'$ apart from the original image point $I_1$.

Now, from the Newton's formula, the object point $O_2$ and the image point $I_2$ satisfy the following relationship:

$$(x+\Delta x)\cdot(x'+\Delta x')=-f^2$$

Therefore, the shift quantity $\Delta x'$ is given by:

$$\Delta x'=(-f^2)\cdot(x+\Delta x)^{-1}-x'$$

Namely, when $k=(x+\Delta x)^{-1}$, $$\Delta x'=kf^2-x' \qquad (4)$$

where x and x' are the constants because of the initial state being fixed. Hence, the image surface movement ($\Delta x'$) with respect to a constant object movement ($\Delta x$=constant) is the quadric function of the focal length f. Accordingly, it can be qualitatively known that the lens such as a super telephoto lens having a very large focal length exhibits an extremely great defocus quantity.

Then, in the conventional camera incorporating an autofocusing mechanism, the focal point has hitherto been detected by employing the focal detector built in the camera body. A camera body AF module 14 herein assumes an image surface position shift quantity ranging from a wide-angle lens to an intermediate telephoto lens. For this reason, when using the interchangeable lens having a larger defocus quantity, as explained above, the AF module often falls into an incapable state to detect the focal point.

Now, the following is an exemplification of a camera system by way of a second embodiment. In this camera system, a focal point of an interchangeable lens having, as explained earlier, an extremely large defocus quantity is made detectable. For this purpose, the focal point is roughly detected by use of the AF module 1 on the side of an interchangeable lens having a wide range to detect the defocus quantity. Thereafter, the focal point is precisely detected by use of the AF module 14 on the side of the camera body.

Then, in the camera system in accordance with this embodiment, the focalizing lens is driven based on the image-forming state information detected by the interchangeable lens AF module 1. Focusing is thus conducted with a substantially rough precision. Thereafter, focusing is effected by employing the camera body AF module 14. Hereat, even if the detection range of the defocus quantity of the camera body AF module 14 is narrow, rough focusing has already been finished. Focusing can be therefore performed with a high precision.

The second embodiment will hereafter be described with reference to FIG. 3.

Figure 3:
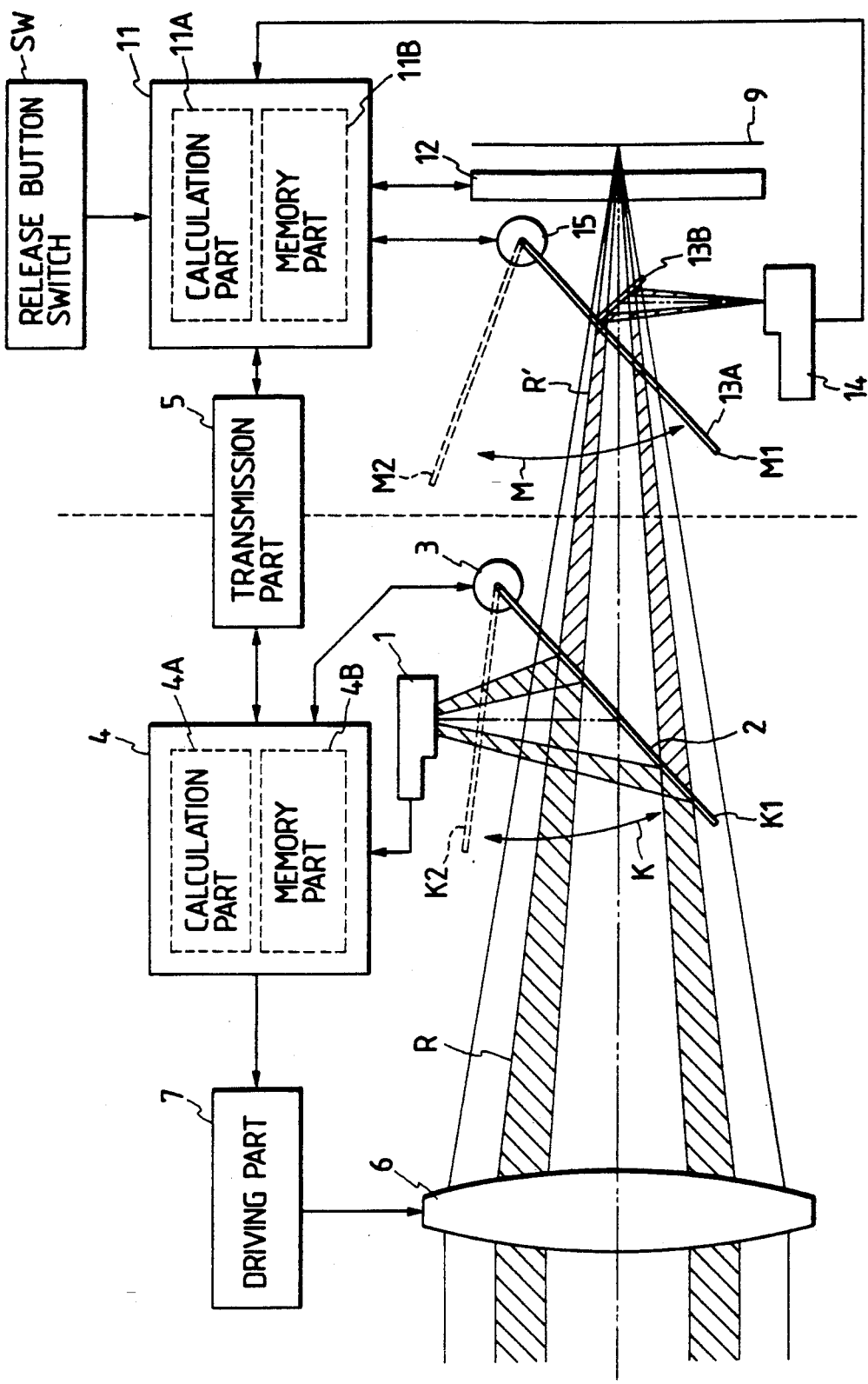
FIG. 3 is a schematic view showing a second embodiment of the present invention.

FIG. 3 is a view schematically illustrating this embodiment. The members incorporating the same functions as those shown in FIG. 1 are marked with the like symbols. In this embodiment, only a focalizing lens 6 is shown as an optical system of the interchangeable lens for simplifying the explanation. Further, in addition to the construction in the preceding embodiment, the camera body includes an AF module 14, a quick return mirror 13A and an auxiliary mirror 13B. The AF module detects an in-focus state. The quick return mirror 13A and the auxiliary mirror 13B cooperate to split the focal detection rays R' toward the camera body AF module 14, the rays R' passing through the half-mirror member 2 on the side of the interchangeable lens. Then, this quick return mirror 13A and the auxiliary mirror 13B are so provided as to be movable in an arrowed direction M between a location M1 and a location M2. The location M1 is set on the skew within the light path of rays traveling through the interchangeable lens. The location M2 indicated by a broken line is set outside the light path. This quick return mirror 13A and the auxiliary mirror 13B are also driven in the arrowed direction M by a mirror driving part 15 on the side of the camera body.

Then, the interchangeable lens AF module 1 is constructed to have a wider range to detect a shift quantity of image surface position than in the camera body AF module 14.

Next, the autofocusing operation in this embodiment will be explained.

To begin with, in accordance with this embodiment, focusing is conducted by use of the camera body AF module 14 in combination with the interchangeable lens AF module 1. Therefore, when mounting this interchangeable lens, an image surface moving coefficient is transmitted via the transmission part 5 to the camera body control part 11 from the interchangeable lens control part 4. This image surface moving coefficient is stored in the memory part 11B of the camera body control part 11. Then, as in the embodiment shown in FIG. 1, the AF start signal is transmitted to the interchangeable lens control part 4 via the transmission part 5 from the camera body. The interchangeable lens control part 4 receives this AF start signal. The interchangeable lens control part 4 permits a start of detection of an image-forming state of the focal detection rays R incident on the AF module 1 through the half-mirror member 2 tilted within the photographing light path. Then, the interchangeable lens AF module 1 detects a current image-forming state of the interchangeable lens. The image-forming state information is transmitted to the interchangeable lens control part 4. The interchangeable lens control part 4 performs arithmetic of the image-forming state information transmitted and an image surface moving coefficient in the memory part 4B as well. The interchangeable lens control part 4 calculates a lens driving quantity of the focalizing lens driving part 7 for driving the focalizing lens 6 in the optical-axis direction.

Then, information on this lens driving quantity is transmitted to the focalizing lens driving part 7. The focalizing lens driving part 7 drives the focalizing lens 6 on the basis of this lens driving quantity information transmitted.

Thereafter, if the image-forming state detected by the AF module 1 is not an in-focus state, the interchangeable lens control part 4 controls to drive the focalizing lens 6 once again.

Then, if the interchangeable lens image-forming state detected by the interchangeable lens AF module 1 is judged to be in focus, a lens-side focusing end signal is transmitted to the camera body control part 11 via the transmission part 5 serving as a transmission means and having the electrical contact.

Further, focusing by use of the interchangeable lens AF module 1 does not involve such an arrangement that the image-forming state of the interchangeable lens is set completely in focus. A focal position of the interchangeable-lens may be set within a focal-point detectable range of the camera body AF module 14.

Hereat, the camera body control part 11 receiving the lens-side focusing end signal permits a start of detection of an image-forming state of focal detection rays R' passing through the quick return mirror 13A for reflecting the light toward an unillustrated finder, then reflected by the auxiliary mirror 13B and incident on the camera body AF module 14.

Then, the camera body control part 11 calculates a lens driving quantity of the focalizing lens driving part 7 from the image surface moving coefficient in the memory part 11B as well as from the information on the image-forming state detected by the camera body AF module 14. This lens driving quantity is transmitted via the transmission part 5 and the interchangeable lens control part 4 to the focalizing lens driving part 7. The focalizing lens driving part 7 drives the focalizing lens 6. Then, this action is repeatedly executed till the information on the image-forming state detected by the camera body AF module 14 indicates an in-focus state.

Subsequently, photographing is conducted after the interchangeable lens has been brought into the in-focus state. The photographing operation in this embodiment is substantially the same as that in the embodiment demonstrated by FIG. 1. A different point from the embodiment shown in FIG. 1 is only the action of the quick return mirror 13A and the auxiliary mirror 13B which split the rays toward the camera body AF module 14 during photographing. This action will hereafter be described.

When depressing the release button SW, the camera body control part 11 transmits a release signal to the interchangeable lens control part 4. Simultaneously, the control part 11 drives the mirror retreating part 15 provided on the side of the camera body. The quick return mirror 13A and the auxiliary mirror 13B are thereby retreated to the retreat location M2 from the location M1 provided on the skew within the light path. Subsequently, upon a completion of action of the shutter 12, the camera body control part 11 transmits a shutter action completion signal to the interchangeable lens control part 4. At the same time, the control part 11 drives the camera body mirror driving part 15. The quick return mirror 13A and the auxiliary mirror 13B are thereby returned to the location M1 provided on the skew within the light path from the retreat location M2.

In accordance with the embodiment discussed above, precise focusing is attainable in principle even in the case of the interchangeable lens showing a large shift quantity of the image surface position.

Herein, a width W of the light receiving element in the interchangeable lens AF module 1 is desirably set as follows:

$$0.6 < 2 \mid \beta \mid \cdot \delta \cdot \tan \theta \cdot W^{-1} < 1.4 \tag{5}$$

where $\delta$ is the maximum value of shift quantity of the image surface position (the shift quantity of the image surface position when the subject distance varies from the infinity to the closest focusing distance), $\beta$ is the magnification of the image-reforming lens within the AF module 1, and $\theta$ is the angle made by the ray incident on an edge of the light receiving element in the AF module 1 and by the optical axis. Herein, if under a lower limit of the formula (5), disadvantageously the AF module increases in size and can not be therefore accommodated in a confined space of the interchangeable lens. Whereas if over an upper limit of the formula (5), undesirably a focusing error tends to occur.

Further, from the formula (3) given above, a focusing range (a detection range of shift quantity of the image surface position) of the AF module is a linear function of the magnification of the image-reforming lens within the AF module. Hence, if the AF module 1 is disposed behind the image surface conjugate to the image surface of the whole photographing optical system, the focusing range of the interchangeable lens AF module 1 is set wider than the focusing range of the camera body AF module 14. For roughly detecting the focal point by use of the interchangeable lens AF module 1, it is desirable that the following relationship be satisfied:

$$\beta_1 > \beta_2 \tag{6}$$

where $\beta_1$: the magnification of the image-reforming lens in the camera body AF module 1, and $\beta_2$: the magnification of the image-reforming lens in the interchangeable lens AF module 14.

Herein, if the conditional formula (6) is not satisfied, the focusing range of the interchangeable lens AF module 1 is narrower than the focusing range of the camera body AF module 14. Consequently, rough focusing can not be disadvantageously executed on the side of the interchangeable lens.

Incidentally, it can be considered that the light receiving elements 142A, 142B within the AF module 1 are extended for expanding the focusing range of the AF module 1. In this case, however, it is disadvantageously impossible to incorporate the AF module 1 into the confined space in the interchangeable lens because of inducing an increase in size of the AF module 1.

In this way, the magnification $\beta_2$ of the image-reforming lens within the interchangeable lens AF module 1 is set smaller than the magnification $\beta_1$ of the image-reforming lens within the camera body AF module 14. In the interchangeable lens AF module, the focusing range expands enough to make rough focusing practicable. When precise focusing is thereafter effected in the camera body AF module 14, it is possible to perform precise focusing even in the case of the interchangeable lens such as a super telephoto lens having a large shift quantity of the image surface position.

Note that if a condenser lens or the like is disposed on the side of a photographing lens of the image-reforming lenses of the AF module, the magnification $\beta$ of the image-reforming lens stated above may be, as a matter of course, a synthetic magnification of those of the image-reforming lens and the condenser lens.

Further, as in the second embodiment shown in FIG. 3, the focusing operations conducted separately in the interchangeable lens AF module and in the camera body AF module are not limited to the super telephoto lens as shown in this embodiment. For instance, the focusing operation is of course applicable to an interchangeable lens such as a microlens having a very large shift quantity of the image surface position.

Further, in accordance with this embodiment, it is feasible to fulfill the focalization of the interchangeable lens such as a super telephoto lens having a large image surface shift quantity without changing the camera body AF module 14.

Additionally, in each embodiment discussed above, a height of incidence (a distance from the optical axis when the rays R are incident on the interchangeable lens) of the focal detection rays R may be small. It is therefore possible to execute precise focusing even in an interchangeable lens exhibiting a low brightness.

Note that in each embodiment discussed above, the half-reflection surface of the half-mirror member 2 serving as a light path splitting means may be also a total-reflection surface. Besides, a plurality of mirrors composed of the reflecting surfaces (half-reflection surfaces) may be provided in place of the half-mirror member 2 including the two half-reflection surfaces 2a, 2b.

In addition, the present invention is applicable without being limited to the focalizing system of the interchangeable lens. The interchangeable lens takes, e.g., an inner focus type wherein focusing is effected by making movable some lenses of a lens group (focalizing lens group). In this type of interchangeable lens, the light path splitting means may be provided in rear of this focalizing lens group. At this time, if the rays emitted from the focalizing lens group are afocal, a condenser optical system may be disposed between the light path splitting means and the image-forming state detecting means. Further, the interchangeable lens adopts an overall extension type wherein the focalization is conducted by extending all the lens groups constituting the interchangeable lens. In this type of interchangeable lens, the light path splitting means may be provided behind all of the lens groups.

As discussed above, the present invention is not restricted to each embodiment described above but may take a variety of constructions without deviating from the gist of the present invention.

What is claimed is:

1. An interchangeable lens mountable into a camera body, comprising:
    a focalizing lens so provided as to be movable in the optical-axis direction of said interchangeable lens;
    a light path splitting means for splitting a bundle of photographing rays outwardly of a light path of said photographing rays, said rays passing through said interchangeable lens;
    an image-forming state detecting means for detecting an image-forming state of said interchangeable lens by receiving said rays split by said light path splitting means;
    a driving means for driving said focalizing lens in the optical-axis direction;
    a retreating means for retreating said light path splitting means outwardly of the light path of said photographing rays;
    a transmitting means for transmitting a release signal from said camera body to said interchangeable lens; and
    a control means for controlling said retreating means on the basis of said release signal through said transmitting means during photographing and controlling said driving means on the basis of a signal from said image-forming state detecting means during focalizing.

2. The interchangeable lens according to claim 1, wherein said control means includes an arithmetic means for performing arithmetic and a memory means for storing information on said interchangeable lens.

3. The interchangeable lens according to claim 2, wherein the information stored in said memory means contains an image surface moving coefficient indicating an image surface shift quantity with respect to the moving quantity of said focalizing lens.

4. The interchangeable lens according to claim 3, wherein said interchangeable lens is a zoom lens in which a focal length is variable, and the information stored in said memory means contains a variation quantity of the image-surface moving coefficient related to zooming.

5. The interchangeable lens according to claim 1, wherein said image-forming state detecting means includes a separator optical system for reforming an image formed in a location conjugate to an image forming surface of said interchangeable lens and a detection element for detecting the rays from said separator optical system.

6. The interchangeable lens according to claim 5, wherein said detection element takes such a configuration as to extend in the one-dimensional direction, and a width W of said detection element in the one-dimensional direction is set to satisfy the following relationship:

$$0.6 < 2 \mid \beta \mid \cdot \delta \tan \theta \cdot W^{-1} < 1.4$$

where
- $\beta$: the magnification of said separator optical system,
- $\delta$: the shift quantity of said image-forming surface when a subject distance varies from the infinity to the closest focusing distance, and
- $\theta$: the angle made by the ray incident on an edge of said detection element and by the optical axis.

7. The interchangeable lens according to claim 1, wherein said light path splitting means includes a mirror that moves selectively between a location provided on the skew within the light path of said photographing rays and a location provided outwardly of the light path.

8. A camera system incorporating with an interchangeable lens detachably attached to a camera body, comprising:
    said camera body for outputting a release signal during photographing, and
    said interchangeable lens,
    said interchangeable lens including:
    a focalizing lens so provided as to be movable in the optical-axis direction of said interchangeable lens;
    a light path splitting means for splitting a bundle of photographing rays outwardly of a light path of said photographing rays, said rays passing through said interchangeable lens;
    an image-forming state detecting means for detecting an image-forming state of said interchangeable lens by receiving said rays split by said light path splitting means;
    a driving means for driving said focalizing lens in the optical-axis direction;
    a retreating means for retreating said light path splitting means outwardly of the light path of said photographing rays;
    a control means for controlling said retreating means and said driving means; and
    a transmitting means for transmitting a release signal from said camera body to said interchangeable lens;
    wherein said control means controls said retreating means on the basis of said release signal during photographing and controlling said driving means on the basis of a signal from said image-forming state detecting means during focalizing.

9. The camera system according to claim 8, wherein said control means includes an arithmetic means for performing arithmetic and a memory means for storing information on said interchangeable lens.

10. The camera system according to claim 8, wherein said image-forming state detecting means includes a separator optical system for reforming an image formed in a location conjugate to an image forming surface of said interchangeable lens and a detection element for detecting the rays from said separator optical system.

11. The camera system according to claim 10, wherein said detection element takes such a configuration as to extend in the one-dimensional direction, and a width W of said detection element in the one-dimensional direction is set to satisfy the following relationship:

$$0.6 < 2 \mid \beta \mid \cdot \delta \tan \theta \cdot W^{-1} < 1.4$$

where

β: the magnification of said separator optical system,

δ: the shift quantity of said image-forming surface when a subject distance varies from the infinity to the closest focusing distance, and θ: the angle made by the ray incident on an edge of said detection element and by the optical axis.

12. The camera system according to claim 9, wherein said light path splitting means includes a mirror that moves selectively between a location provided on the skew within the light path of said photographing rays and a location provided outwardly of the light path.

13. A camera system comprising:

a camera body; and an interchangeable lens detachably attached to said camera body, said interchangeable lens including:

a focalizing lens movable in the optical-axis direction of said interchangeable lens;

a driving means for driving said focalizing lens in the optical-axis direction;

a first light path splitting means for splitting a bundle of photographing rays outwardly of a light path of said photographing rays, said rays passing through said interchangeable lens;

a first image-forming state detecting means for detecting an image-forming state of said interchangeable lens by receiving said rays split by said first light path splitting means;

a retreating means for retreating said first light path splitting means outwardly of the light path of said photographing rays;

a first control means for controlling said driving means on the basis of an output from said first image-forming state detecting means; and a transmitting means for transmitting a signal from said camera body to said control means;

said camera body including:

a second light path splitting means for splitting the photographing rays outwardly of the light path of said photographing rays, said rays passing through said interchangeable lens;

a second image-forming state detecting means for detecting the image-forming state of said interchangeable lens by receiving said rays split by said second light path splitting means; and a second control means for controlling said driving means on the basis of an output from said second image-forming state detecting means and outputting a release signal to said first control means via said transmitting means during photographing, wherein said first control means controls said first retreating means on the basis of the release output during photographing, and said first image-forming state detecting means has a focusing range wider than a focusing range of said second image-forming state detecting means.

14. The camera system according to claim 13, wherein said second control means controls said driving means after said first control means has finished controlling said driving means.

15. The interchangeable lens according to claim 13, wherein said first image-forming state detecting means includes a first separator optical system for reforming an image formed in a location conjugate to an image forming surface of said interchangeable lens and a detection element for detecting the rays from said first separator optical system, and wherein said second image-forming state detecting means includes a second separator optical system for reforming an image formed in a location conjugate to an image forming surface of said interchangeable lens and a detection element for detecting the rays from said second separator optical system.

16. The interchangeable lens according to claim 15, wherein said first and second image-forming state detecting means are constructed to satisfy the following relationship:

$$\beta_1 > \beta_2$$

where $\beta_1$ is the magnification of said first separator optical system, and $\beta_2$ is the magnification of said second separator optical system.

* * * * *